March 5, 1963     A. C. JOHNSTON     3,079,959
THREE-D VIEWER
Filed Feb. 24, 1959     2 Sheets-Sheet 1
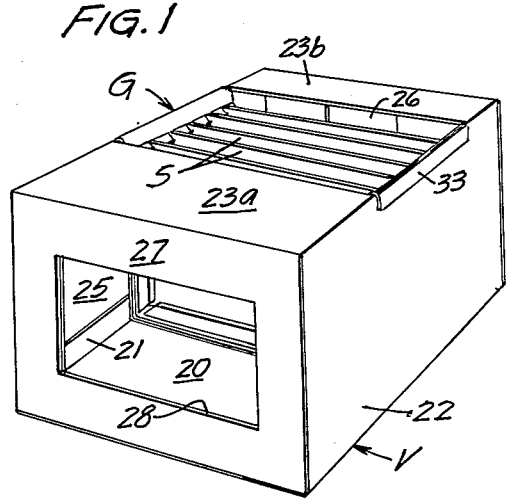
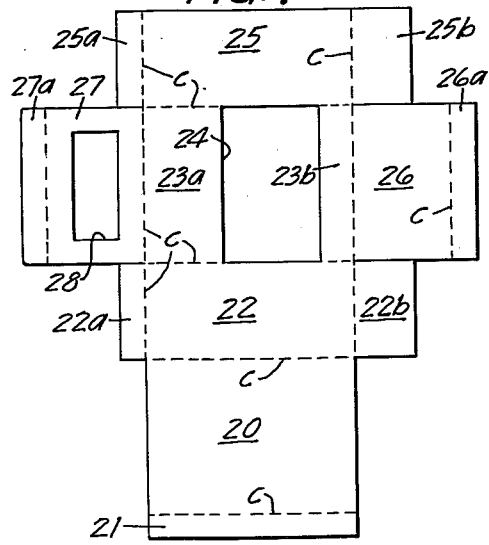
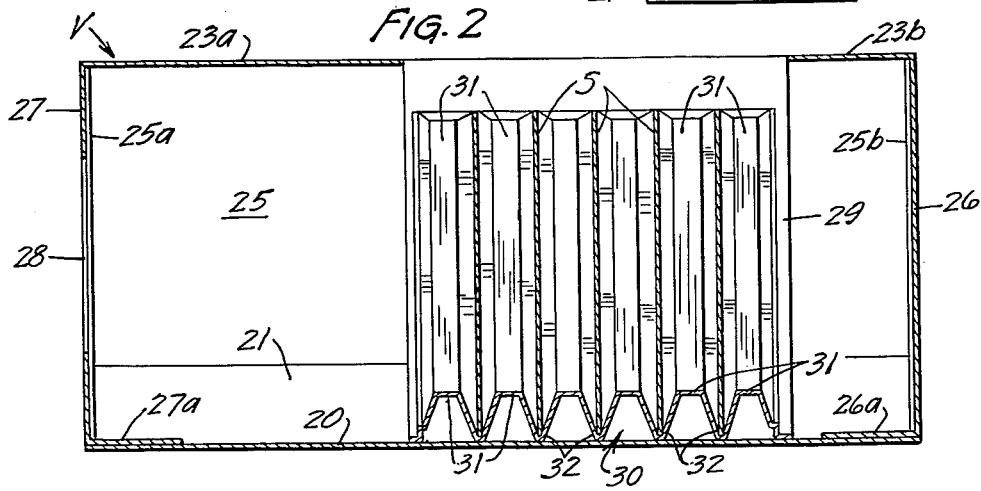
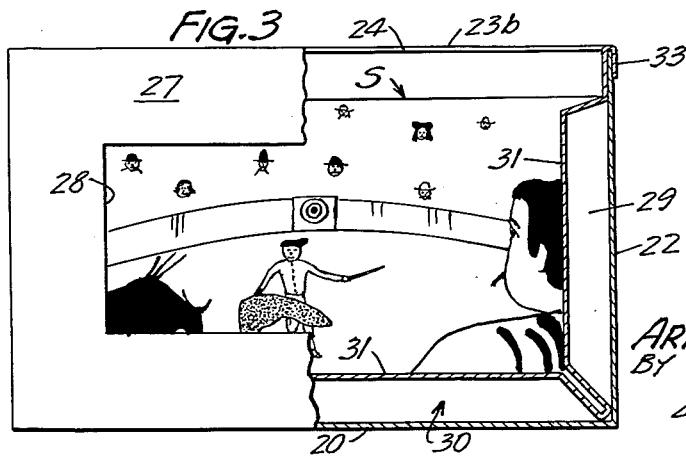
INVENTOR
ARTHUR C. JOHNSTON
BY Williamson,
Schroeder & Palmatier
ATTORNEYS March 5, 1963 A. C. JOHNSTON 3,079,959
THREE-D VIEWER
Filed Feb. 24, 1959 2 Sheets-Sheet 2
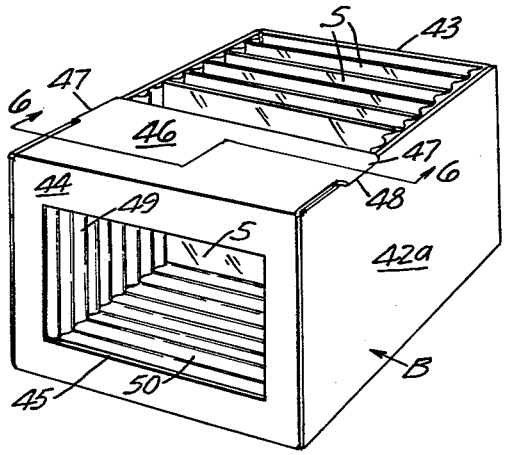
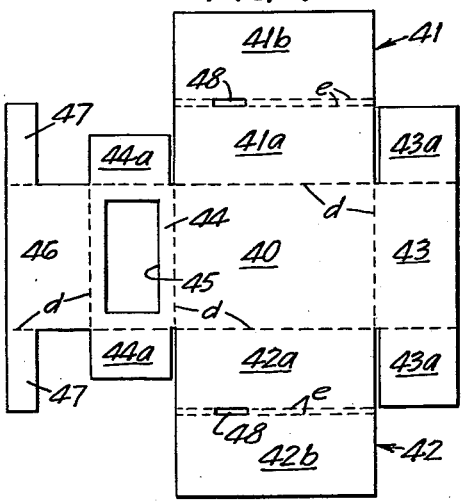
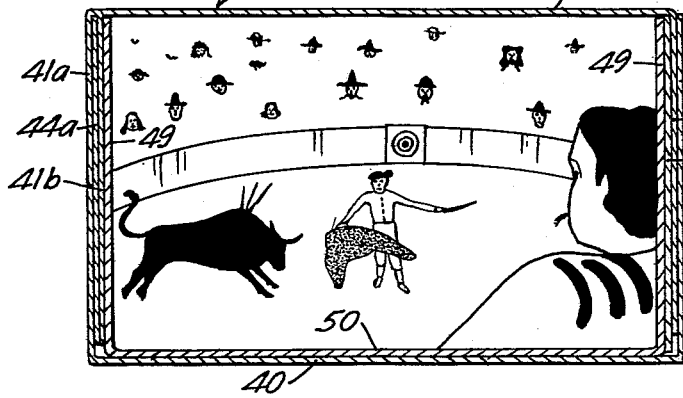
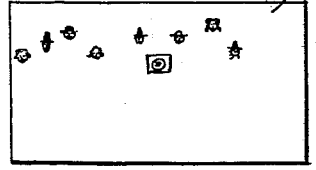
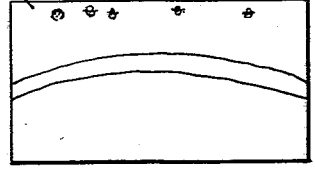
INVENTOR
ARTHUR C. JOHNSTON
BY Williamson,
Schroeder + Palmatier
ATTORNEYS

3,079,959
THREE-D VIEWER
Arthur C. Johnston, 4823 Dupont Ave., S.,
Minneapolis, Minn.
Filed Feb. 24, 1959, Ser. No. 795,209
5 Claims. (Cl. 41—21)

This invention relates to a hobby craft device which is creative, entertaining and educational and consists of a viewer adapted to show a composite picture or scene in three dimensional form.

An object of this invention is a viewing device which shows a picture or scene by depth segmentation so as to give a three dimensional effect to the viewer.

Another object is a viewing device in which segments of a composite scene are arranged in spaced apart relationship within the viewer itself so as to produce scenic depth to the viewer.

Still another object is a viewing device in which the segments of a picture are grouped together in spaced apart relationship to produce a composite picture or scene giving to the viewer the impression of depth therein.

Still another object is a viewing device adapted to receive and hold a plurality of slides in aligned spaced apart relationship each of said slides carrying a segment of a picture or scene, the composite effect of said slides being a three dimensional effect to the viewer.

A further object is a viewing device of the class described wherein the slides may be arranged and rearranged or regrouped in any fashion desired to produce a composite scene having various aspects thereof.

Still another object is a device of the class described which may be readily held in the hand for easy viewing thereof, is simple in design and inexpensive to make and is collapsible for ease in shipment and storing thereof.

A further object is a hobbycraft type viewing device which stimulates a person's creative artistic talents and encourages him to create and develop original pictures and scenes having depth thereto when properly drawn and displayed, and teaches a person how to draw and group to obtain scenic depth or a three-dimensional effect.

A still further object is a device of the class described wherein the picture segment carried by each slide may be replaced by another segment to depict scenes of whatever nature desired.

These and other objects and advantages of my invention will more fully appear from the following description made in connection with the accompanying drawings, wherein like reference characters refer to the same or similar parts throughout the several views and in which:

FIG. 1 is a perspective view of the viewer of my invention in assembled condition;

FIG. 2 is a vertical longitudinal sectional view of my invention;

FIG. 3 is a front elevational view of my invention with portions thereof in broken away section for a better understanding thereof;

FIG. 4 is a plan view of the carton blank forming the viewer of my invention;

FIG. 5 is a perspective view of still another form of my invention;

FIG. 6 is an irregular vertical cross sectional view of the form shown in FIG. 5;

FIG. 7 is a plan view of the carton blank of FIG. 5;

FIG. 8 is a cross sectional view of the removable insert used in FIG. 5; and

FIGS. 9 through 13 illustrate slides carrying segments of a composite picture thereon.

Referring to the drawings for a preferred embodiment of my invention and particularly to the form shown in FIGS. 1 through 4, the device of my invention as shown in FIGS. 1 through 4 inclusive comprises a collapsible viewing box or shell V, a removable slide guide insert G and a plurality of slides S removably inserted in the guide insert and held in aligned spaced relationship thereby. The viewing box as best seen in FIG. 4 includes a bottom panel 20 having a hinged locking flap 21, said bottom panel being hingedly connected to a side panel 22 which in turn is hingedly connected at one side thereof to a top panel having a front portion 23a and a back portion 23b and which is provided with a light receiving and guide insert G receiving window 24, said top panel being in turn connected at the opposite side thereof to the other side panel 25. A back end panel 26 is hingedly connected to one end of the back portion 23b of the top panel and a front end panel 27 having a viewing window or peep hole 28 in the face thereof and connected to the front end 23a of the top panel. The end panels 26 and 27 are provided with locking flaps 26a and 27a respectively and the side panels 22 and 25 are provided with a pair of corner locking flaps 22a and 22b and 25a and 25b respectively. The dotted lines indicated by the small letter c represent the fold lines which hingedly interconnect the various portions of the box. The carton blank shown in FIG. 4 is easily assembled along the fold lines in well known fashion to form the viewing box V as best illustrated in FIG. 1 and may be formed of any sturdy lightweight material such as plastic or cardboard.

The guide insert G consists of a pair of corrugated or channelled side panels 29 and a corrugated or channelled bottom panel 30, the side panels being preferably hingedly connected to the bottom panel to permit said insert to be disposed in a flat condition for ease in shipping and storing and also to permit the sides to be raised perpendicular to the bottom (as best seen in FIG. 3). The side panels and the bottom panel are provided with aligned corrugated faces having a plurality of alternately raised portions or ridges 31 separated by grooves or channels 32 (preferably of V-shaped cross section) between each of said ridges which grooves are adapted to receive and hold the slides S hereinafter to be described. The insert G in effect serves as a stage for the slides, which stage is lighted by a source of light entering through the opening 24 in the top of the box above the insert or stage. The insert G is adapted to be inserted into the assembled viewing box V through the opening 24 in the top thereof and is of a size which permits the side panels of said insert to be contiguous with the inner faces of the side panels 22 and 25 of the viewing box, each of said side panels being provided at its upper marginal edge with an overhanging lip 33 which slips over and receives the upper marginal edge of the side panels 22 and 25 defining the sides of the light opening 24 in the top of said viewing box. The guide insert G of FIGS. 1–4 is preferably of sturdy lightweight plastic although it is obvious that other types of material may be employed. The removable slides S are of semi-rigid transparent material and are preferably of a type of material upon which pictures may be painted and the paint may be subsequently removed as by washing or by a mild chemical solution which is not injurious to the slide material. The slides are intended to have a portion or segment of a composite picture painted thereon with a different portion of the composite picture being on individual slides. The slides are then inserted into the guide grooves 32 provided by the insert G and are held in spaced apart relationship. These slides are readily insertable and removable from the guide insert and may be arranged in any order desired to produce the composite picture or effect desired.

As an illustrative example, FIGS. 9 through 13 inclusive, show slides carrying the various segments of a scene such as a bull fight in which it is desired to show a scene looking over the shoulder of a person sitting in the stands of a bull fight arena looking into the arena itself. Thus, the slide of FIG. 9 shows the partial figure of a man over whose shoulder the viewer might be looking. The slide of FIG. 10 carries the picture of the bull. The slide of FIG. 11 carries the picture of the toreador. The slide of FIG. 12 shows the people sitting in the arena or stadium on the far side thereof and the slide of FIG. 13 is the backdrop or provides the background of the entire scene and illustrates the fence surrounding the arena and the general distant effect of the stands themselves. By inserting these slides in their proper order in the guide insert in the viewer box and holding the viewer box with the top opening 24 exposed to a source of light and with the eyes of the viewer properly positioned so as to peer through the peep hole or viewer opening 28, the viewer sees the composite picture of the bull fight as presented by these slides as best seen in FIGS. 3 and 6, said composite picture having scenic depth and producing a three dimensional effect.

By regrouping these slides or rearranging them in a different order in the box, a different impression of the same general scene may be obtained. The slides may have the pictures permanently or removably placed thereon and a large number of these slides may be purchased or made to present various scenes in three dimensional aspect to the viewer. However, it is primarily intended that the user will use washable or removable paint or decals or cutouts so as to create various scenes much as an artist would and to utilize his own creative ability to produce various scenes having scenic depth or a three-dimensional effect when properly viewed after being placed in the viewing box.

The guide insert is preferably of light color and preferably white in order to better illuminate the viewing area surrounding the slides, while the inside of the box is preferably of a dark color such as black for better contrast and ease in viewing. In some instances it may be preferred to have a part or all of the back inside portion of the viewer behind the slides of some intermediate color such as red or blue, to produce a peculiar or particular lighting effect behind the scene.

FIGS. 5 through 8 show still another form of my invention. The viewing box of this form consists of a bottom panel 40 and side panels 41 and 42 hingedly connected thereto as by means of fold line d, said side panels having an outer and inner portion 41a and 41b and 42a and 42b respectively, said inner and outer portions being hingedly connected along suitable fold lines e provided, said bottom panel being hingedly connected at the ends thereof to a back panel 43 and a front end panel 44 having a viewing window or peep hole 45 therein, said front end panel 44 being hingedly connected to a top panel 46 having elongate locking tabs 47 hingedly connected to the sides thereof adjacent the upper marginal edge thereof. The front and back end panels are each provided with a pair of corner skirts or flaps 44a and 43a respectively hingedly connected to the sides thereof which in assembled relationship are disposed between the inner and outer portions of the side panels, the inner portion of the side panels overlapping said skirts to provide the inner side surface or face of the viewing box.

A slot 48 is provided in the fold line e of each of the side panels and is adapted to receive the elongate locking tabs 47 hingedly connected to the top panel portion, the locking tabs in assembled condition being disposed vertically downward through the slots between the inner and outer walls of the side panels. The dotted lines shown in FIG. 4 represent the fold lines d which hingedly connect the various portions of the viewing box. This carton as represented by the blank of FIG. 7 may also be readily assembled along the fold lines in an obvious fashion. The guide insert G' of this form of my invention is of sturdy cardboard construction having side walls 49 and a bottom panel 50 of corrugated cross section, as best seen in FIG. 8, and is adapted to be inserted into the opening defined by the side wall and bottom panel of the viewer box after they have been assembled and before the top panel is folded over and locked into place. The sides and bottom of the insert are corrugated in nature, the alternate ridges 51 and grooves 52 thereof being in substantial alignment on each portion of the insert, the grooves serving as a guide track for receiving the slides hereinbefore described. In this form, the insert in addition to providing guide means for the slides also serves to reinforce the box and lock the inner portions of the side walls of the viewing box in a substantially vertical position.

In both forms of my invention, it will be noted that the top panel portion adjacent the front or viewing side of the box provides a shaded area within the box itself between the viewing end of the box and the foremost of the slides which greatly enhances the viewability of the slides.

In addition, the back portion of the top panel of the viewing box as provided in the form best illustrated in FIG. 1 also provides a shaded area in the back portion of the box which in many cases and for some types of scenes also enhances the viewability thereof.

Thus, from the foregoing description, the advantages of my invention are readily apparent. The entire unit, including the viewing box and guide inserts, are folding or collapsible in nature so as to break down into a flat compact form for ease in storage and shipping and are readily reassembled in a very short time by simply folding up the carton or viewing box into assembled form and inserting the guide insert therein, after which the unit is ready for use. Obviously the slide receiving grooves or channels may be formed a part of the sides and bottom of the viewer box so as to be integral therewith, the choice being primarily one of cost and ease of manufacture.

Portions or segments of a composite scene or picture depicted on a plurality of slides, preferably by painting, and preferably in an original creative manner, and the slides are grouped as desired in aligned, spaced apart fashion, to present to the viewer a composite scene having scenic depth or a three-dimensional effect. The slides may be arranged and rearranged by varying their respective positions in the viewer to present the same scene or picture in different aspects and angles. Thus, the creative artistic talents of the user are stimulated and made productive, and the person is taught how to proportion various segments of a composite scene or picture to gain the proper effect when dealing with three-dimensional pictures.

Another important feature to note is that the distance between adjacent slides may be varied as desired, and this enables the scenic depth to be selectively varied to vary the three-dimensional effect and add to the enjoyment and education of the user.

It will, of course, be understood that various changes may be made in the form, details, arrangement and proportions of the various parts without departing from the scope of my invention.

What is claimed is:

1. A viewing device for presenting a picture in three dimensional form comprising in combination an elongate viewing box which is erectable from a flat unassembled collapsed package to define a viewing chamber having front, rear, top, bottom and side walls, said top wall having a cut out portion providing an opening for admitting slides into said chamber and for admitting light to said chamber to illuminate said slides when mounted therewithin, guide means for said slides removably insertable into said chamber through said cutout portion, said guide means providing a plurality of grooved mounting means disposed in said box beneath said opening and arranged in series longitudinally thereof for removably and slidably mounting a plurality of slides simultaneously in said chamber transversely of said box and normal to said side and bottom walls and in spaced apart opposition to one another such that all of the slides are spanned by said opening and such that the entire surface area of said slides exposed to view is illuminated by light entering the box through said opening in a direction generally parallel to said slides, a viewing opening in the front of said box in alignment with slides mounted therein, said cutout portion being spaced from said front end whereby said walls provide a shaded area intermediate said viewing opening and said slides, a first slide insertable in said chamber beneath said cutout portion and retainable by said mounting means, said first slide having a part of said picture depicted on the front side thereof, and one or more transparent second slides insertable in said chamber and retainable therein by said mounting means beneath said cutout portion forwardly of said first slide in spaced apart opposition thereto, said second slides each having another part of said picture depicted on a portion thereof whereby said slides when viewed through said opening present a composite picture.

2. The viewing device of claim 1 wherein said walls are hingedly interconnected and form a single integral carton blank which in unassembled condition forms a flat package from which said box is assembled by foldably erecting said walls.

3. The viewing device of claim 2, wherein said guide means comprises an elongate insert having end portions hingedly connected to a center portion whereby said insert can be stretched out flat after removal from said box, and whereby when inserted in said box said end portions assume a vertical position in contiguous opposition to the respective side walls of said box and said center portion overlies the bottom of said box, said end portions being corrugated longitudinally of said insert and providing a series of parallel vertically disposed slide receiving slots when mounted in said box.

4. The viewing device of claim 1, wherein said guide means comprises an elongate insert having end portions hingedly connected to a center portion whereby said insert can be stretched out flat after removal from said box, and whereby when inserted in said box said end portions assume a vertical position in contiguous opposition to the respective side walls of said box and said center portion overlies the bottom of said box and extends transversely thereof, said end portions being corrugated longitudinally of said insert and providing a series of parallel vertically disposed slide receiving slots when mounted in said box.

5. The viewing device of claim 4, wherein the interior of said box is black, and the portion of said insert exposed to view in said box is white for better contrast and ease of viewing.

References Cited in the file of this patent

UNITED STATES PATENTS

| | | |
|---|---|---|
| 2,151,055 | Stark | Mar. 21, 1939 |
| 2,565,553 | Foley | Aug. 28, 1951 |
| 2,577,320 | Fenyo | Dec. 14, 1951 |
| 2,580,164 | Flynn | Dec. 25, 1951 |